United States Patent
Usuda et al.

(10) Patent No.: US 7,885,617 B2
(45) Date of Patent: Feb. 8, 2011

(54) BASE STATION, RADIO LINE CONTROL STATION, AND RADIO COMMUNICATION METHOD

(75) Inventors: Masafumi Usuda, Shinagawa-ku (JP); Hiroyuki Ishii, Yokosuka (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 663 days.

(21) Appl. No.: 11/718,469

(22) PCT Filed: Oct. 31, 2005

(86) PCT No.: PCT/JP2005/020010

§ 371 (c)(1),
(2), (4) Date: Nov. 9, 2007

(87) PCT Pub. No.: WO2006/049127

PCT Pub. Date: May 11, 2006

(65) Prior Publication Data

US 2008/0132183 A1 Jun. 5, 2008

(30) Foreign Application Priority Data

Nov. 2, 2004 (JP) ............................ 2004-319883

(51) Int. Cl.
*H03C 7/02* (2006.01)
*H04B 1/02* (2006.01)
*H04B 7/02* (2006.01)
(52) U.S. Cl. .................. 455/91; 455/101; 455/561; 375/267; 375/299
(58) Field of Classification Search ...... 455/561–562.1, 455/101–105, 504; 375/267, 299
See application file for complete search history.

(56) References Cited

U.S. PATENT DOCUMENTS 5,859,875 A * 1/1999 Kato et al. .................. 375/267

(Continued)

FOREIGN PATENT DOCUMENTS

JP 58 15341 1/1983

(Continued)

OTHER PUBLICATIONS

3GPP TS 25.214, V6.2.0: $3^{RD}$ Generation Partnership Project; Technical Specification Group Radio Access Network; Physical Layer Procedures (FDD) (Release 6), 2004.

(Continued)

*Primary Examiner*—Simon D Nguyen
(74) *Attorney, Agent, or Firm*—Oblon, Spivak, McClelland, Maier & Neustadt, L.L.P.

(57) ABSTRACT

A base station (10) according to the present invention includes: a plurality of amplifiers (15a, 15b) configured to amplify radio frequency signals; a plurality of antennas (16a, 16b) configured to transmit the RF signals amplified by the plurality of amplifiers (15a, 15b); a judging unit (123) configured to judge whether or not to transmit the RF signals by applying a transmission diversity using the plurality of antennas (16a, 16b); and a baseband signal processor unit (12) configured to generate baseband signals having an identical symbol pattern and an identical amplitude, as baseband signals that are bases of the RF signals to be transmitted from the plurality of antennas (16a, 16b), when the judging unit (123) determines not to apply the transmission diversity.

11 Claims, 10 Drawing Sheets

U.S. PATENT DOCUMENTS

| | | | | |
|---|---|---|---|---|
| 7,308,018 | B2 * | 12/2007 | Seeger et al. | 375/141 |
| 7,324,617 | B1 * | 1/2008 | Banerjee et al. | 375/347 |
| 7,372,911 | B1 * | 5/2008 | Lindskog et al. | 375/267 |
| 2002/0060996 | A1 * | 5/2002 | Kwak et al. | 370/335 |
| 2004/0157643 | A1 * | 8/2004 | Brandes et al. | 455/561 |
| 2004/0203451 | A1 * | 10/2004 | Braun et al. | 455/67.11 |
| 2005/0003768 | A1 * | 1/2005 | Laroia et al. | 455/101 |
| 2005/0084029 | A1 * | 4/2005 | Lim | 375/267 |
| 2005/0181736 | A1 * | 8/2005 | Cao et al. | 455/69 |

FOREIGN PATENT DOCUMENTS

| | | |
|---|---|---|
| JP | 64 73832 | 3/1989 |
| JP | 6-37683 | 2/1994 |
| JP | 8 195703 | 7/1996 |
| JP | 10 107685 | 4/1998 |
| JP | 2002-64414 | 2/2002 |
| WO | WO 03/085858 A1 | 10/2003 |

OTHER PUBLICATIONS

3GPP TS 25.214, V5.8.0: $3^{RD}$ Generation Partnership Project; Technical Specification Group Radio Access Network; Physical Layer Procedures (FDD) (Release 5), 2004.

Office Action mailed Aug. 3, 2010, in Japanese Patent Application No. 2006-542372 (with English-language Translation).

* cited by examiner

| MODE | $N_{FBD}$ | $N_W$ | UPDATA RATE | FEEDBACK BIT RATE | $N_{po}$ | $N_{ph}$ |
|---|---|---|---|---|---|---|
| 1 | 1 | 1 | 1500 Hz | 1500 bps | 0 | 1 |
| 2 | 1 | 4 | 1500 Hz | 1500 bps | 1 | 3 |

BASE STATION, RADIO LINE CONTROL STATION, AND RADIO COMMUNICATION METHOD

TECHNICAL FIELD

The present invention relates to a base station, a radio network control station, and a radio communication method.

BACKGROUND ART

In the mobile communication, there is a case where a signal level is fluctuated instantaneously on a receiver side due to multipath fading or the like, and where a reception quality of an uplink signal at a base station or a reception quality of a downlink signal at a mobile station is therefore significantly deteriorated. A reception diversity and a transmission diversity are techniques for reducing such deterioration in the reception quality.

The reception diversity is a technique to receive a signal by use of a plurality of antennas, on a receiver side. The transmission diversity is a technique to transmit a plurality of signals having different symbol patterns or amplitudes by use of a plurality of antennas, on a transmitter side.

The transmission diversity can attempt to reduce fluctuation of a signal level without increasing the scale of circuits or the number of antennas on the receiver side, and is therefore applied mainly to signal transmission in a downlink from a base station to a mobile station (see Non-Patent Document "3GPP RAN TS25.214 V6.2.0.", June 2004, for example).

The transmission diversity is broadly categorized into two schemes, an open loop transmission diversity scheme and a closed loop transmission diversity scheme.

In the closed loop transmission diversity scheme, a mobile station transmits a command for instructing a phase of a transmission signal to a base station through an uplink, in order to obtain a high reception power by a signal combining at the mobile station. Since there may be a case where an error occurs in the course of transmission through the uplink, the mobile station makes a judgment on the phase of the transmission signal actually set by the base station. This judgment is called an antenna verification (see Non-Patent Document "3GPP 25.214 V5.8.0, Annex A", April 2004).

The antenna verification is executed by use of at least one of a predicted value (a prior probability) of a command error rate and an error rate (a posterior probability) figured out by use of a reception signal of a pilot signal contained in a dedicated channel.

However, an application of the transmission diversity has not always contributed to improvement in the reception quality. By contraries, there has also been a case where an application of the transmission diversity has led to deterioration in the reception quality as compared to a case of not applying the transmission diversity.

For example, it is possible to obtain an effect of a time diversity (hereinafter referred to as a "user diversity effect") by allowing the base station to perform a high-speed scheduling by use of a downlink shared channel. However, there has been a case where applying the open loop transmission diversity scheme reduced a user diversity effect, and where therefore not applying this scheme has resulted in a higher user diversity effect.

FIG. 1 shows a user diversity effect in the case where a base station not applying the transmission diversity transmits signals by use of a single antenna. FIG. 2 shows a user diversity effect in the case of using the open loop transmission diversity scheme. In FIG. 1 and FIG. 2, the vertical axis indicates a reception power and a downlink transmission rate while the horizontal axis indicates time.

As shown in FIG. 1 and FIG. 2, the reception powers show sharper increases and decreases in the case of not applying the transmission diversity (FIG. 1), and therefore a higher user diversity effect than in the case of applying the transmission diversity (FIG. 2) can be achieved by allocating a shared channel to a user having a high reception power. As a result, it is possible to enhance a downlink transmission rate and thereby to increase throughput.

Meanwhile, in the closed loop transmission diversity scheme, it has been sometimes difficult to render errors of the antenna verification sufficiently low, when the dedicated channel had a low speed, and when the power was small, for example. In particular, when a mobile station performs a soft handover, the reception power of each base station connected to the mobile station is reduced by performing a selective combining or the like. In short, the reception power per base station is reduced. For this reason, the reception power of commands is reduced while an error rate of the commands is increased, thereby increasing the probability of occurrence of errors in the antenna verification. As a result, there has been the case of causing not only reduction in the transmission diversity effect but also deterioration in the reception quality as compared to the case of not applying the transmission diversity.

As described above, a disadvantage caused by the transmission diversity has exceeded an advantage obtained by the transmission diversity in some cases. As a consequence, an application of the transmission diversity has sometimes led to deterioration in the quality of the downlink, reduction in the radio capacity attributable to an increase in required transmission power, and deterioration in the transmission efficiency in comparison with the case of not applying the transmission diversity.

In this case, it is conceivable to perform the transmission from a single antenna without applying the transmission diversity. However, the base station designed to be capable of applying the transmission diversity is equipped with amplifiers for the respective antennas in order to transmit signals from the plurality of antennas. The maximum power of each amplifier is equivalent to an electric power obtained by dividing the maximum power which can be outputted from the amplifiers of the base station not applying the transmission diversity by the number of the amplifiers.

For example, while a base station not applying the transmission diversity includes an amplifier having the maximum output of 20 W, a base station applying the transmission diversity includes two amplifiers each having the maximum output of 10 W.

For this reason, the transmission power is reduced when the base station capable of applying the transmission diversity performs the transmission by use of the single antenna. This results in reduction in the radio capacity and deterioration in the transmission efficiency. Eventually, a radio area that can be actually covered by the base station is reduced.

DISCLOSURE OF THE INVENTION

It is an object of the present invention to enhance reception quality of a mobile station while avoiding reduction in a radio area which is virtually coverable by a base station that can apply the transmission diversity.

A first aspect of the present invention is summarized to include: a plurality of amplifiers configured to amplify radio frequency signals; a plurality of antennas configured to transmit the radio frequency signals amplified by the plurality of amplifiers; a judging unit configured to judge whether or not to transmit the radio frequency signals by applying a transmission diversity using the plurality of antennas; and a baseband signal processor unit configured to generate baseband signals having an identical symbol pattern and an identical amplitude, as baseband signals that are bases of the radio frequency signals to be transmitted from the plurality of antennas, when the judging unit determines not to apply the transmission diversity.

A second aspect of the present invention is summarized to include: a judging unit configured to judge whether or not a base station transmits radio frequency signals by applying a transmission diversity using a plurality of antennas; and a base station controller unit configured to instruct the base station to generate baseband signals having an identical symbol pattern and an identical amplitude, as baseband signals that are bases of the radio frequency signals to be transmitted from the plurality of antennas, when the judging unit determines not to apply the transmission diversity.

A first aspect of the present invention is summarized to include, in a radio communication method, judging whether or not to transmit radio frequency signals by applying a transmission diversity using a plurality of antennas; generating baseband signals having an identical symbol pattern and an identical amplitude, as baseband signals that are bases of the radio frequency signals to be transmitted from the plurality of antennas, when it is determined not to apply the transmission diversity; amplifying the radio frequency signals obtained by subjecting the baseband signals to frequency conversion; and transmitting, at the plurality of antennas, the amplified radio frequency signals.

BEST MODES FOR CARRYING OUT THE INVENTION

Figure 3:
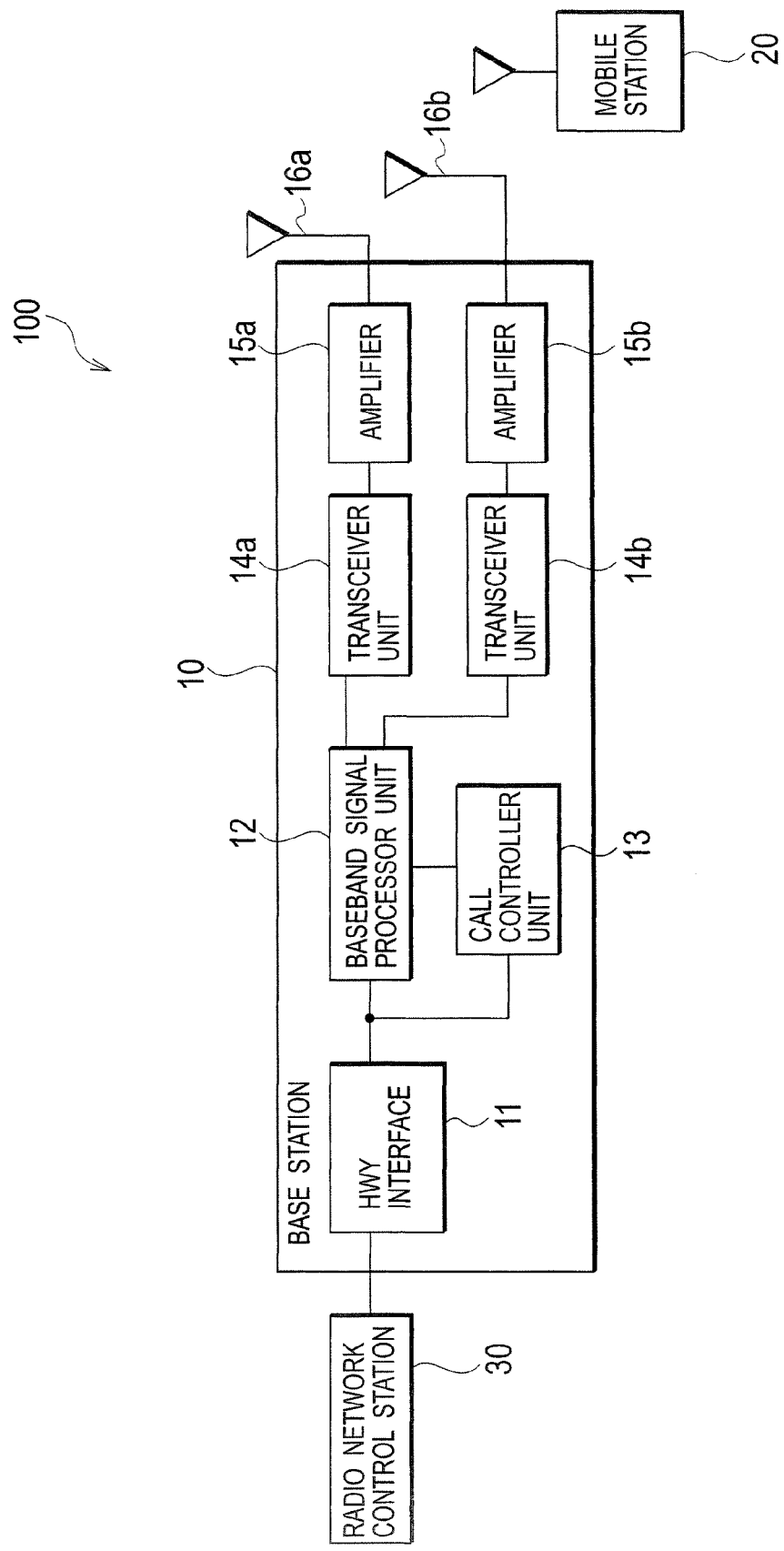
FIG. 3 is a view showing a configuration of a mobile communication system according to an embodiment of the present invention.

As shown in FIG. 3, a mobile communication system 100 includes a mobile station 20, a base station 10, and a radio network control station 30.

The radio network control station 30 is the device located at the upper level of the base station 10 and is configured to control the radio communication between the base station 10 and the mobile station 20.

The base station 10 includes an HWY interface 11, a baseband signal processor unit 12, a call controller unit 13, a plurality of transceiver units 14a and 14b, a plurality of amplifiers 15a and 15b, and a plurality of antennas 16a and 16b.

The baseband signal processor unit 12 performs a signal processing concerning baseband signals. The baseband signal processor unit 12 acquires from the HWY interface 11 and the call controller unit 13 user data and control data to be transmitted to the mobile station 20 through a downlink.

The baseband signal processor unit 12 generates baseband signals including the acquired user data and control data.

The baseband signal processor unit 12 generates the baseband signals to be transmitted from the respective antennas 16a and 16b, and inputs the signals respectively to the transceiver units 14a and 14b. Specifically, the baseband signal processor unit 12 generates the baseband signals by performing an error correction encoding of the data to be transmitted through the downlink, a spreading process, and the like.

Moreover, the baseband signal processor unit 12 acquires baseband signals, which are received from the mobile station 20 through an uplink, from the transceiver units 14a and 14b.

The baseband signal processor unit 12 extracts the user data and the control data from the acquired baseband signals and inputs these data to the HWY interface 11 and the call controller unit 13. Specifically, the baseband signal processor unit 12 obtains the data by performing a despreading process of the baseband signals received through the uplink, a RAKE combining, an error correction decoding, and the like.

In addition, the baseband signal processor unit 12 performs a retransmission control such as hybrid ARQ (hybrid Automatic Repeat reQuest, hereinafter referred to as "HARQ"), scheduling for the mobile station 20, a selection of a transport format (TF), and the like.

The transceiver units 14a and 14b acquire the baseband signals from the baseband signal processor unit 12 and convert frequencies thereof into radio frequency signals (hereinafter referred to as "RF signals") having radio frequencies.

The transceiver units 14a and 14b input the converted RF signals to the amplifiers 15a and 15b. The transceiver units 14a and 14b acquire the RF signals received from the amplifiers 15a and 15b and performs a frequency conversion of the signals into the baseband signals. The transceiver units 14a and 14b input the converted baseband signals to the baseband signal processor unit 12.

The amplifiers 15a and 15b acquire the RF signals from the transceivers 14a and 14b and input the signals to the antennas 16a and 16b after amplification. The amplifiers 15a and 15b acquire the RF signals from the antennas 16a and 16b and input the signals to the transceiver units 14a and 14b after the amplification.

The antennas 16a and 16b acquire the amplified RF signals in the downlink from the amplifiers 15a and 15b and transmit the signals to the mobile station 20. The antennas 16a and 16b receive RF signals in the uplink from the mobile station 20 and input the signals to the amplifiers 15a and 15b.

In this way, the base station 10 includes the plurality of amplifiers configured to amplify the RF signals, the plurality of antennas configured to transmit the RF signals amplified by the plurality of amplifiers, and the plurality of transceivers. In short, the base station 10 includes the plurality of transmission systems and is capable of applying the transmission diversity.

The HWY interface 11 is the interface with the radio network control station 30. The HWY interface 11 receives from the radio network control station 30 the user data to be transmitted to the mobile station 20 through the downlink and inputs the data to the baseband signal processor unit 12.

The HWY interface 11 receives the control data for the base station 10 from the radio network control station 30 and inputs the data to the call controller unit 13.

The HWY interface 11 acquires the user data, which are received from the mobile station 20 through the uplink, from the baseband signal processor unit 12 and transmits the data to the radio network control station 30.

The HWY interface 11 acquires the control data for the radio network control station 30 from the call controller unit 13 and transmits the data to the radio network control station 30.

The call controller unit 13 performs a call control and an allocation of radio resources to the mobile station 20, and so forth. The call controller unit 13 exchanges the control data concerning the call control with the radio network control station 30 and the mobile station 20. Moreover, the call controller unit 13 also performs a condition management of the base station 10, and so forth.

Figure 4:
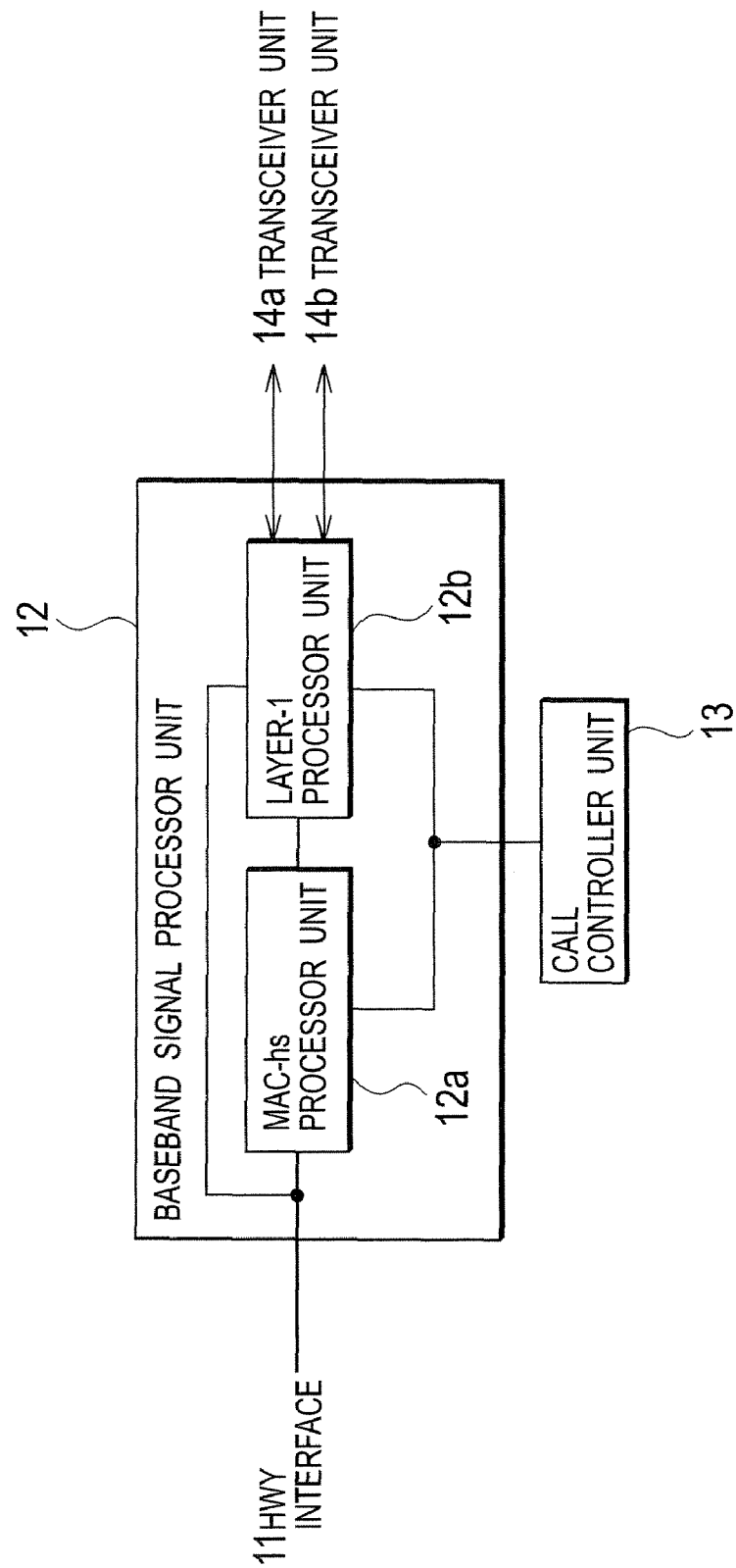
FIG. 4 is a block diagram showing a configuration of a baseband signal processor unit according to the embodiment of the present invention.

Next, the baseband signal processor unit 12 will be described more in detail. As shown in FIG. 4, the baseband signal processor unit 12 includes an MAC-hs processor unit 12a and a layer-1 processor unit 12b.

The MAC-hs processor unit 12a performs the retransmission control (HARQ) of a downlink shared channel and the scheduling for the mobile station 20.

The layer-1 processor unit 12b generates the baseband signals by performing the error correction encoding of the data to be transmitted through the downlink, the spreading process, and the like. Moreover, the layer-1 processor unit 12b performs the error correction decoding of the signals received through the uplink, the RAKE combining, the despreading process, the transmission power control of the dedicated channels in the downlink and the uplink, and so forth.

Each of the MAC-hs processor unit 12a and the layer-1 processor unit 12b is connected to the HWY interface 11 and the call controller unit 13.

Furthermore, the layer-1 processor unit 12b inputs the generated baseband signals to the transceiver units 14a and 14b and acquires the received RF signals from the transceiver units 14a and 14b.

Figure 5:
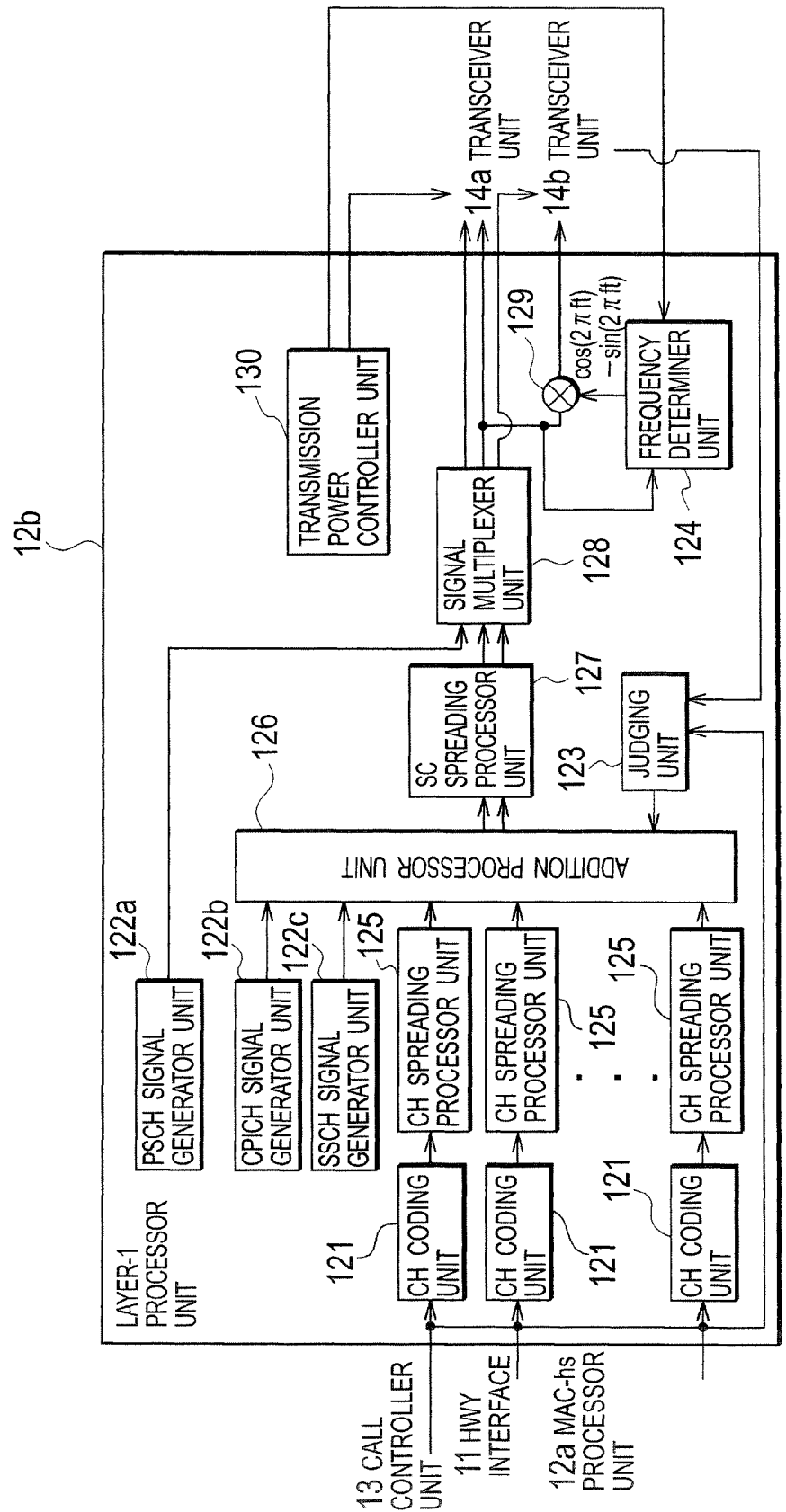
FIG. 5 is a block diagram showing a configuration of a layer-1 processor unit according to the embodiment of the present invention.

Here, the layer-1 processor unit 12b will be described more in detail. FIG. 5 shows processing functions concerning the transmission to the mobile station 20 through the downlink. Note that processing functions concerning the reception from the mobile station 20 through the uplink are omitted in FIG. 5. Moreover, FIG. 5 shows a configuration in the case of applying a closed loop transmission diversity scheme as the transmission diversity.

The layer-1 processor unit 12b includes a plurality of CH coding units 121, a PSCH signal generator unit 122a, a CPICH signal generator unit 122b, an SSCH signal generator unit 122c, a judging unit 123, a frequency determiner unit 124, a plurality of CH spreading processor units 125, an addition processor unit 126, an SC spreading processor unit 127, a plurality of signal multiplexer units 128, a multiplier unit 129, and a transmission power controller unit 130 configured to perform the transmission power control of dedicated channels in the downlink and the uplink.

The judging unit 123 judges whether or not to transmit the RF signals (the radio frequency signals) by applying the transmission diversity using the plurality of antennas 16a and 16b. The judging unit 123 comprehensively evaluates advantages to be obtained by applying the transmission diversity and disadvantages to be incurred by applying the transmission diversity.

For example, according to conditions of propagation paths of a radio area covered by the base station 10, types of channels to be transmitted by the base station 10, and the like, the judging unit 123 judges whether the reception quality of the mobile station 20 is improved by applying the transmission diversity or the reception quality is improved by not applying the transmission diversity.

Further, the judging unit 123 may make a judgment in light of whether the required transmission power is increased or not, whether deterioration in the transmission efficiency is incurred or not and so forth depending on the application of the transmission diversity. The judging unit 123 can judge the conditions of propagation channels according to the RF signals received by the transceiver units 14a and 14b, for example.

Moreover, the judging unit 123 can judge the types of channels for transmitting the data according to the types of the user data and the control data to be inputted from the HWY interface 11, the MAC-hs processor unit 12a and the call controller unit 13. The judging unit 123 inputs a judgment result to the addition processor unit 126.

The CH coding unit 121 acquires the user data and the control data to be transmitted through dedicated channels or a shared channel from the HWY interface 11, the MAC-hs processor unit 12a and the call controller unit 13. The CH coding unit 121 generates a complex signal by subjecting the user data and the control data thus acquired to the CRC assignment, the error correction encoding, the interleaving, and the like. The CH coding unit 121 inputs the generated complex signal to the CH spreading processor unit 125.

The CH spreading processor unit 125 executes a spreading process by use of a spreading code called a CHannelization Code, which is applied to identification of a physical channel. The CH spreading processor unit 125 subjects the complex signal to the spreading process by use of the channelization code corresponding to the type of the channel for transmitting the complex signal. The CH spreading processor unit 125 inputs the complex signal after the spreading process to the addition processor unit 126.

The PSCH signal generator unit 122a generates a signal (hereinafter referred to as a "PSCH signal") to be transmitted through a Primary Synchronization CHannel. The PSCH signal generator unit 122a inputs the generated PSCH signal to the signal multiplexer unit 128.

The CPICH signal generator unit 122b generates a signal for a Common Pilot CHannel (hereinafter referred to as a "CPICH").

The SSCH signal generator unit 122c generates a signal to be transmitted through a Secondary Synchronization Channel (Hereinafter referred to as an "SSCH"). The CPICH signal generator unit 122b and the SSCH signal generator unit 122c input the CPICH signal and the SSCH signal thus generated to the addition processor unit 126. Here, the CPICH signal and the SSCH signal are also the complex signals.

The addition processor unit 126 adds the complex signal acquired from the CH spreading processor unit 125, the CPICH signal, and the SSCH signal together. The addition processor unit 126 inputs a signal obtained by addition (hereinafter referred to as an "added signal") to the SC spreading processor unit 127. The addition processor unit 126 acquires a judgment result of the application or non-application of the transmission diversity from the judging unit 123. The addition processor unit 126 executes different processes according to the judgment result.

Figures 6, 7:
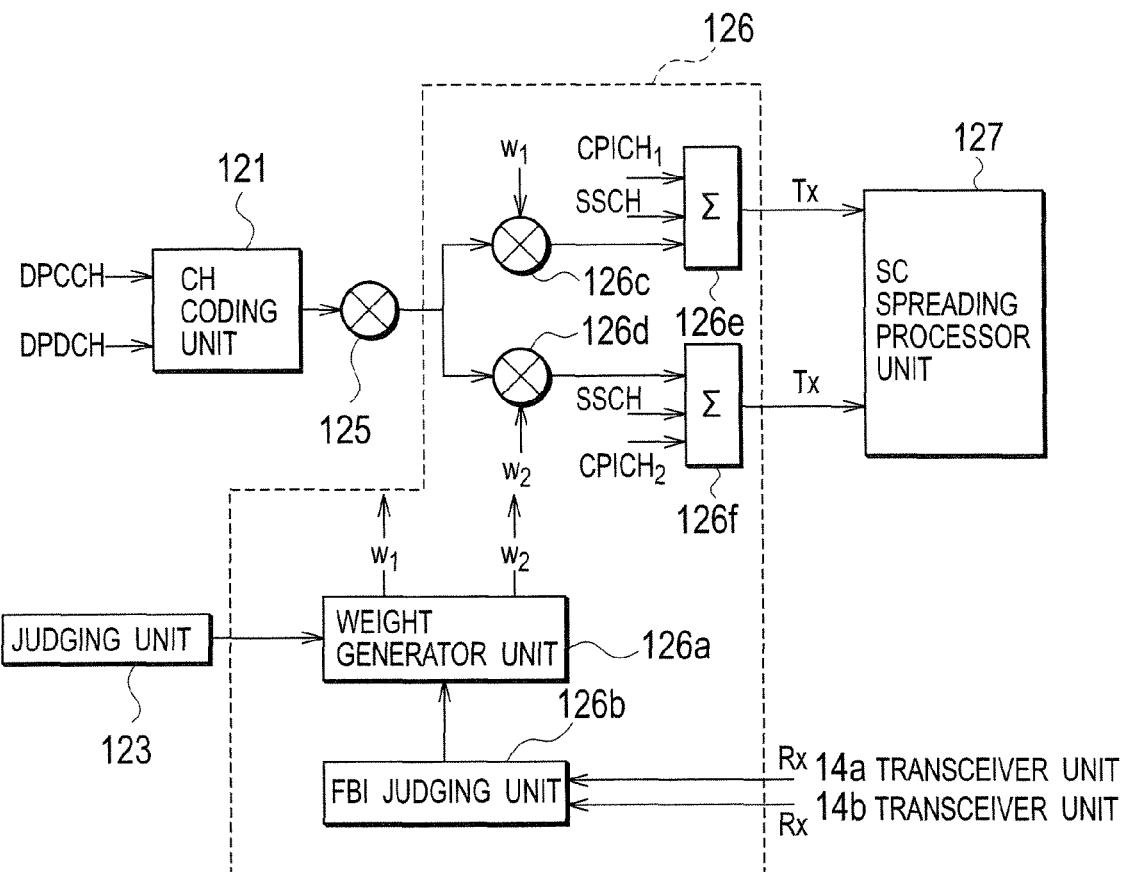
FIG. 6 is a block diagram showing a configuration of an addition processor unit according to the embodiment of the present invention.
FIG. 7 is a view showing specifications of a closed loop transmission diversity scheme according to the embodiment of the present invention.

The processes to be executed by the addition processor unit 126 will be described in detail by using FIG. 6. FIG. 6 shows a case of applying the closed loop transmission diversity scheme to dedicated channels (DPCCH: Dedicated Physical Control Channel, DPDCH: Dedicated Physical Data Channel) which include the uplink and the downlink.

The processes, for which the CH coding unit 121 and the CH spreading processor unit 125 are responsible, are executed similarly in both cases when applying and not applying the transmission diversity, and the complex signals after the spreading process are inputted to the addition processor unit 126.

The addition processor unit 126 includes a weight generator unit 126a, a FBI judging unit 126b, a plurality of multiplier units 126c and 126d, and a plurality of adders 126e and 126f.

The FBI judging unit 126b judges an FBI (Feed Back Indicator) transmitted from the mobile station 20 through the uplink. The FBI is a command from the mobile station 20 for indicating a phase and amplitude of a transmission signal.

Specifically, the FBI includes instructions for complex antenna weights $w_1$ and $w_2$ to be used for generating the baseband signals of the respective antennas 16a and 16b. The FBI judging unit 126b acquires the FBI out of a FBI field mapped on the DPCCH in the uplink. The FBI judging unit 126b judges D-bit of the acquired FBI as well as the complex antenna weights $w_1$ and $w_2$ instructed by the mobile station 20. The complex antenna weights $w_1$ and $w_2$ are combinations of the phase and the amplitude, which are set so as to allow the mobile station 20 to achieve the highest reception power by performing a signal combining. The FBI judging unit 126b instructs the weight generator unit 126a to generate the judged complex antenna weights.

The weight generator unit 126a acquires a judgment result from the judging unit 123.

Here, as shown in FIG. 7, the closed loop transmission diversity scheme includes two modes. In FIG. 7, reference code $N_{FBD}$ denotes the number of FBI bits in one slot. Reference code $N_W$ denotes a message length of a FB signal message containing the FBI. Reference code $N_{po}$ denotes a number of phase bits existing in 1 FB signal message. Reference code $N_{ph}$ denotes the number of amplitude bits existing in 1 FB signal message.

By the application of this closed loop transmission diversity scheme, it is possible to sequentially change the phases and the amplitude of the radio frequency signals which are transmitted by the respective antennas 16a and 16b sequentially in accordance with the instruction from the mobile station 20, whereby the mobile station 20 can obtain gain as a result of the signal combining. Specifically, the mobile station 20 is able to generate the complex antenna weights judged to be capable of obtaining the highest reception power, as a result of the signal combining, and to obtain large gain by the signal combining. The closed loop transmission diversity scheme requires the instructions from the mobile station 20 and is therefore effective in the case of using the channel which includes the uplink.

The SC spreading processor unit 127 is configured to perform, for each cell, a spreading process by use of an individual spreading code which is used for identification of cells and is called a scrambling code. The SC spreading processor unit 127 inputs the added signal after the spreading process to the signal multiplexer unit 128.

The signal multiplexer unit 128 forms baseband signals by multiplexing the added signal after the spreading process and the PSCH signal.

One of the baseband signals outputted from the signal multiplexer unit 128 and split into two, is directly inputted to the transceiver unit 14a. The other split baseband signal is inputted to the multiplier 129.

Now, the processes by the layer-1 processor unit 12b included in the baseband signal processor unit 12 will be described more in detail in the cases of applying the transmission diversity and not applying the transmission diversity as a result of judgment by the judging unit 123.

(When the Judging Unit 123 Determines the Application of the Transmission Diversity)

When the judging unit 123 determines the application of the transmission diversity, the weight generator unit 126a generates the complex antenna weights $w_1$ and $w_2$ to be multiplied by the complex signals after the spreading process. The weight generator unit 126a generates the complex antenna weights $w_1$ and $w_2$ in accordance with the instruction by the FBI judging unit 126b and inputs the weights to the multipliers 126c and 126d of the respective antennas 16a and 16b. The complex signals after the spreading process are split for each of the antennas 16a and 16b and are respectively inputted to the multipliers 126c and 126d from the CH spreading processor unit 125.

The multipliers 126c and 126d multiply the complex signals acquired from the CH spreading processor unit 125 respectively by the complex antenna weights $w_1$ and $w_2$ acquired from the weight generator unit 126a. In this way, the phases and the amplitude of the baseband signals for each of the antennas 16a and 16b are controlled, thereby obtaining the phase and amplitude of the baseband signals for each of the antennas 16a and 16b with mutually different values.

The multipliers 126c and 126d input the complex signals multiplied by the antenna weights respectively to the adders 126e and 126f.

Each of the adders 126e and 126f adds the CPICH signal and the SSCH signal to the complex signal acquired from the multipliers 126c and 126d. Here, the antenna 16a and the antenna 16b have mutually different CPICH signals.

The adders 126e and 126f input the added signals to the SC spreading processor unit 127. When applying the closed loop transmission diversity scheme as described above, the addition processor unit 126 inputs two types of the added signals for the antennas 16a and 16b to the SC spreading processor unit 127.

The SC spreading processor unit 127 acquires the two types of the added signals for the antennas 16a and 16b from the addition processor unit 126. For this reason, the SC spreading processor unit 127 executes the spreading process for the two types of the added signals by use of the scrambling code of the cell covered by the base station 10. Then, the SC spreading processor unit 127 inputs the added signals for the antennas 16a and 16b subjected to the spreading process to the signal multiplexer unit 128.

The signal multiplexer unit 128 acquires the two types of the added signals for the antennas 16a and 16b from the SC spreading processor unit 127. For this reason, the signal multiplexer unit 128 generates the baseband signals for the antennas 16a and 16b by multiplexing each of the added signals for the antennas 16a and 16b with the PSCH signal. The signal multiplexer unit 128 inputs the baseband signals for the antennas 16a and 16b respectively to the transceiver units 14a and 14b.

When determining the application of the transmission diversity by use of the plurality of antennas 16a and 16b as described above, the baseband signal processor unit 12 can generate the baseband signals for each of the plurality of antennas 16a and 16b.

(When the Judging Unit 123 Determines the Non-application of the Transmission Diversity)

When the judging unit 123 determines the non-application of the transmission diversity, the weight generator unit 126a generates a weight where the output from any of the multipliers 126c and 126d becomes equal to 0 as complex antenna weights to be multiplied by the complex signals after the spreading process.

For example, the weight generator unit 126a sets the complex antenna weight $w_2$ equal to 0 irrespective of the judgment result by the FBI judging unit 126b.

In this case, the weight generator unit 126a can select an appropriate value for achieving a high reception quality at the mobile station 20 in consideration of the judgment result by the FBI judging unit 126b.

The multipliers 126c and 126d multiply the complex signals acquired from the CH spreading processor unit 125 respectively by the complex antenna weights $w_1$ and $w_2$ acquired from the weight generator unit 126a. Consequently, the output from the multiplier 126d becomes equal to 0.

The adder 126f receiving no input from the multiplier 126d does not output an added signal. Only the adder 126e receiving the input of the complex signal from the multiplier 126c adds the complex signal, the CPICH signal and the SSCH signal together and inputs the added signal to the SC spreading processor unit 127.

When not applying the closed loop transmission diversity scheme as described above, the addition processor unit 126 inputs one type of the added signal to the SC spreading processor unit 127.

The SC spreading processor unit 127 acquires the one type of the added signal from the addition processor unit 126. For this reason, the SC spreading processor unit 127 executes the spreading process for the one type of the added signal by use of the scrambling code of the cell covered by the base station 10. Then, the SC spreading processor unit 127 inputs the one type of the added signal after the spreading process, to the signal multiplexer unit 128.

The signal multiplexer unit 128 acquires the one type of the added signal from the SC spreading processor unit 127. Thereafter, the signal multiplexer unit 128 generates one type of the baseband signal by multiplexing the one type of the added signal with the PSCH signal. Then, the signal multiplexer unit 128 splits the added signal, being multiplexed, into two types and inputs the signals to the transceiver units 14a and 14b.

By splitting the single signal into two types as described above, the baseband signals having the same symbol pattern and the same amplitude are inputted to the transceiver units 14a and 14b.

As described above, the baseband signal processor unit 12 can generate the baseband signals having the same symbol pattern and the same amplitude as the baseband signals constituting the bases of the radio frequency signals to be transmitted from the plurality of antennas 16a and 16b when having determined not to apply the transmission diversity by use of the plurality of antennas 16a and 16b.

In this way, the base station 10 includes the plurality of amplifiers configured to amplify the radio frequency signals, the plurality of antennas configured to transmit the radio frequency signals amplified by the plurality of amplifiers, the judging unit 123 configured to judge whether or not it is appropriate to transmit the radio frequency signals by applying the transmission diversity using the plurality of antennas, and the baseband signal processor unit 12 configured to generate the baseband signals having the same symbol pattern and the same amplitude as the baseband signals constituting the bases of the radio frequency signals to be transmitted from the plurality of antennas when the judging unit 123 determines the non-application of the transmission diversity.

With the above-described base station 10, when it is judged whether or not it is appropriate to transmit the radio frequency signals by applying the transmission diversity in order to obtain the high reception quality and the base station 10 determines the non-application of the transmission diversity, the base station 10 is able to generate the baseband signals having the same symbol pattern and the same amplitude, to amplify the signals with the plurality of amplifiers and to transmit the signals from the plurality of antennas. In this way, the base station 10 can achieve the transmission that is substantially to the same as the transmission with the transmission power with which a base station not applying the transmission diversity transmits radio frequency signals from a single antenna. As a result, the base station 10 that can apply the transmission diversity is able to switch between the application and the non-application of the transmission diversity in order to obtain the high reception quality and to maintain a virtually coverable radio area without reduction even in the case of not applying the transmission diversity.

The case in which the judging unit 123 determines the non-application of the transmission diversity will be described more in detail.

The multiplier 129 and the frequency determiner unit 124 are used for generating the baseband signals having mutually different phases for the antenna 16a and 16b. In short, the baseband signal processor unit 12 generates the baseband signals having the different phases for the respective antennas when the judging unit 123 determines not to apply the transmission diversity.

Figure 8:
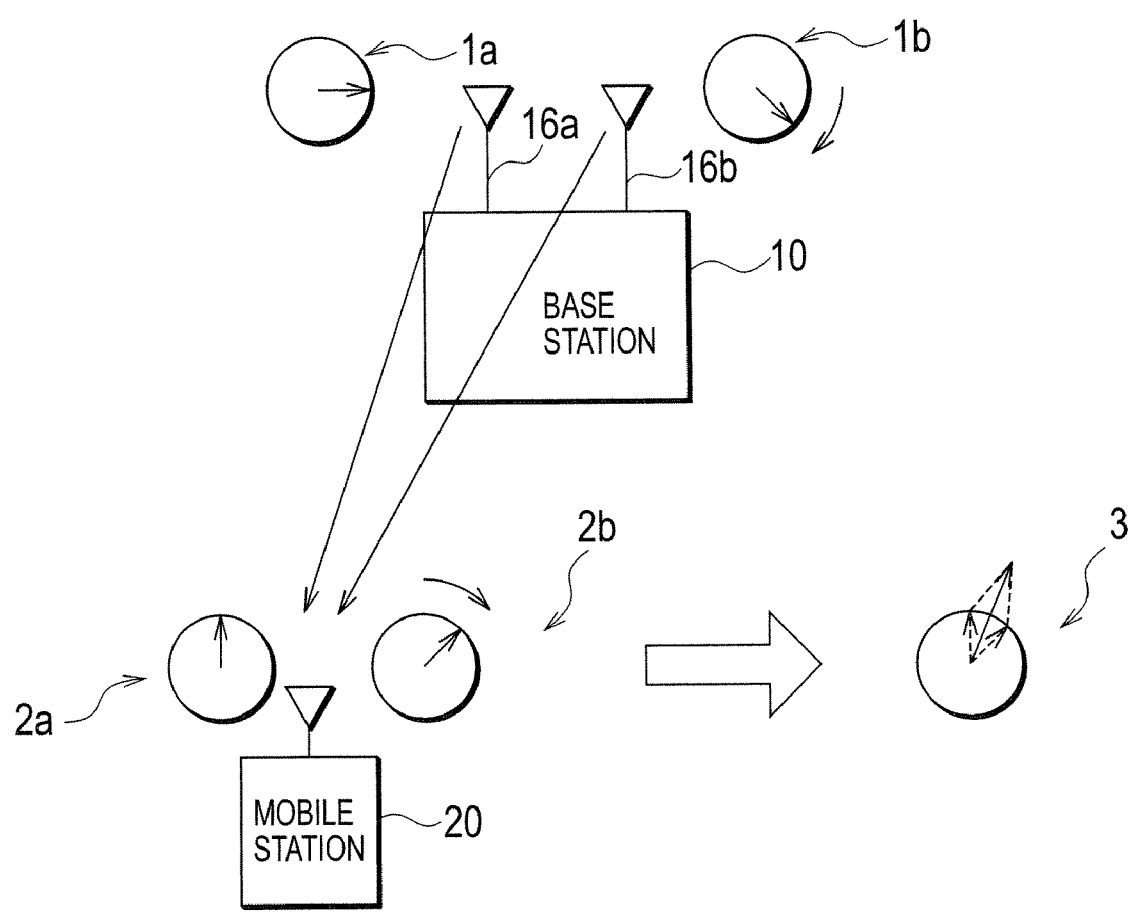
FIG. 8 is a view showing an aspect of transmission and reception in the case of setting a phase difference according to the embodiment of the present invention.

To be specific, as shown in FIG. 8, the multiplier 129 and the frequency determiner unit 124 of the baseband signal processor unit 12 included in the base station 10 function as phase rotating unit configured to rotate a phase 1a of the baseband signal constituting the base of the radio frequency signal to be transmitted by the antenna 16a and thereby obtaining a phase 1b of the baseband signal constituting the base of the radio frequency signal to be transmitted by the antenna 16b. With this configuration, the baseband signal processor unit 12 generates the baseband signal having a phase different from the phase for the antenna 16a.

In this way, the base station 10 is able to prevent interference caused by transmitting the radio frequency signal formed by frequency conversion of the baseband signal having the same symbol pattern and the same amplitude and thereby to further enhance the reception quality.

The frequency determiner unit 124 determines a frequency to be used for setting a phase difference between the baseband signals for the plurality of antennas 16a and 16b in order to generate the baseband signals having the different phases for the antennas 16a and 16b. Using the determined frequency, the baseband signal for the antenna 16a is subjected to the phase rotation on a complex plane to obtain the baseband signal for the antenna 16b. For example, the frequency determiner unit 124 can determine the frequency according to the types of channels of the complex signals contained in the baseband signals. Specifically, the frequency determiner unit 124 sets the phase difference between the baseband signals of the plurality of antennas 16a and 16b by use of a determined frequency f. To be more precise, the frequency determiner unit 124 can set the phase difference by assigning the determined frequency f to Formula (1) shown below.

$$\cos(2\pi ft) - \sin(2\pi ft) \quad \text{Formula (1)}$$

Here, the frequency determiner unit 124 determines the frequency f according to proportions of the complex signals of the respective channel types in the baseband signals. In short, the baseband signal processor unit 12 determines the frequency to be used for setting the phase difference between the baseband signals of the plurality of antennas according to the types of the channels included in the complex signals contained in the baseband signals.

In this way, the base station 10 can set the phase difference appropriately according to the types of the channels contained in the baseband signals.

For example, the frequency determiner unit 124 can determine a low frequency as the frequency when the proportion of the complex signal on a shared channel is equal to or above a shared channel threshold. The frequency determiner unit 124 can determine a high frequency as the frequency when the proportion of the complex signal on a dedicated channel is equal to or above a dedicated channel threshold. The shared channel threshold indicates the proportion of the complex signal on the shared channel when the low frequency is supposed to be used. The dedicated channel threshold indicates the proportion of the complex signal on the dedicated channel when the high frequency is supposed to be used.

In short, the baseband signal processor unit 12 determines the low frequency as the frequency when the proportion of the complex signal on the shared channel is equal to or above the shared channel threshold, and determines the high frequency as the frequency when the proportion of the complex signal on the dedicated channel is equal to or above the dedicated channel threshold.

With this configuration, the base station 10 is able to enhance a user diversity effect on the shared channel and to increase the transmission efficiency. Moreover, the base station 10 can enhance an interleave effect on the dedicated channel by means of an acceleration of a change in signal intensity by setting the high frequency. The user diversity effect on the shared channel and the interleave effect on the dedicated channel will be described more in detail.

The frequency determiner unit 124 can determine the low frequency when the proportion of the transmission power, in the baseband signal, of a High Speed-Downlink Shared Channel (HS-DSCH) for transmitting the control data concerning the adaptive modulation coding or scheduling to the transmission power of the baseband signal is equal to or above the shared channel threshold.

Meanwhile, the frequency determiner unit 124 can determine the high frequency when the proportion of the transmission power, in the baseband signal, of a dedicated control channel for transmitting the control data concerning the transmission power control to the transmission power of the baseband signal is equal to or above the dedicated channel threshold.

The low frequency is the frequency, which is lower than the frequency to be used when the proportion of the transmission power of the dedicated control channel is equal to or above the dedicated channel threshold. The high frequency is the frequency, which is higher than the frequency to be used when the proportion of the transmission power of the shared control channel is equal to or above the shared channel threshold. The frequency determiner unit 124 can preset the low frequency and the high frequency to be used. Moreover, the shared channel threshold and the dedicated channel threshold can be set in light of the transmission power, for example.

Here, an example of the frequency used for setting the phase difference (the frequency used for the phase rotation) will be illustrated by use of concrete values. Here, the example in the case of using a 2-GHz band as a frequency band, setting a transmission interval and an allocation interval on the shared channel equal to 2 ms, and setting a transmission interval on the dedicated channel equal to 20 ms will be described. These conditions represent the values used in a mobile communication system of the W-CDMA mode, of which detailed specifications are being established by the 3GPP. Since the transmission interval and the allocation interval on the shared channel are equal to 2 ms, an allocation frequency is equal to 1/0.002=500 Hz. It is, therefore, possible to obtain the user diversity effect subordinate to fading variation by setting the Doppler frequency to a value sufficiently smaller than 500 Hz. Accordingly, the frequency used for setting the phase difference can be set in a range from 10 Hz to 100 Hz, for example.

Meanwhile, since the transmission interval on the dedicated channel is equal to 20 ms, transmission blocks are transmitted at a frequency of 1/0.02=50 Hz. It is, therefore, possible to obtain the interleave effect by setting the frequency used for setting the phase difference to a value sufficiently higher than the frequency for transmitting the transmission blocks. Accordingly, the frequency used for setting the phase difference may be set in a range from 100 Hz to 200 Hz, for example.

The frequency determiner unit 124 can determine the type of the channel according to the channelization code used for multiplication of the complex signal contained in the baseband signal. In addition, the frequency determiner unit 124 can acquire the transmission power of each channel from the transmission power controller unit 130. Thereafter, the frequency determiner unit 124 performs a comparison between the proportion of the complex signal on the shared channel and the shared channel threshold as well as a comparison between the proportion of the complex signal on the dedicated channel and the dedicated channel threshold, and determines the frequency according to results of the comparison.

The frequency determiner unit 124 sets the phase difference between the baseband signals of the plurality of antennas 16a and 16b by using the determined frequency f. To be more precise, the frequency determiner unit 124 can set up the phase difference by assigning the determined frequency f to Formula (1) shown below.

$$\cos(2\pi ft) - \sin(2\pi ft) \quad \text{Formula (1)}$$

The frequency determiner unit 124 and the multiplier 129 can subject the baseband signal (the multiplexed complex signal) to the phase rotation at an amount equivalent to an angular velocity $\cos(2\pi ft) - \sin(2\pi ft)$ by using the phase difference calculated with Formula (1) as the angular velocity. Specifically, the frequency determiner unit 124 inputs the angular velocity $\cos(2\pi ft) - \sin(2\pi ft)$ to the multiplier 129. The multiplier 129 rotates the phase by multiplying the baseband signal (the multiplexed complex signal), acquired from the signal multiplexer unit 128, by the angular velocity inputted from the frequency determiner unit 124. Note that the frequency determiner unit 124 may use a preset frequency. The multiplier 129 inputs the baseband signal having the rotated phase to the transceiver 14b.

In this way, as shown in FIG. 8, the base station 10 transmits from the antenna 16a the RF signal having the phase 1a, which is obtained by frequency conversion of the phase baseband signal having the phase 1a. The base station 10 transmits from the antenna 16b the RF signal having the phase 1b, which is obtained by frequency conversion of the phase baseband signal having the phase 1b generated by rotating the phase 1a of the RF signal transmitted from the antenna 16a.

The mobile station 20 acquires a reception signal having a phase 3 formed by combining a reception signal having a phase 2a, which is transmitted and received from the antenna 16a, and a reception signal having a phase 2b, which is transmitted and received from the antenna 16b. In short, the reception signal actually received by the mobile station 20 proves to be the reception signal having the phase 3.

As described above, the baseband signal processor unit 12 can generate the baseband signals having the same symbol pattern and the same amplitude as the baseband signals constituting the bases of the radio frequency signals transmitted from the multiple antennas 16a and 16b in the case of determining the non-application of the transmission diversity using the plurality of antennas 16a and 16b.

Furthermore, the baseband signal processor unit 12 can generate the baseband signals having mutually different phases for the antennas 16a and 16b.

Note that the respective configurations of the base station 10, the baseband signal processor unit 12 and the layer-1 processor unit 12b shown in FIGS. 3 to 6 may be provided as a part of hardware or as software by means of programs on a processor.

Figure 9:
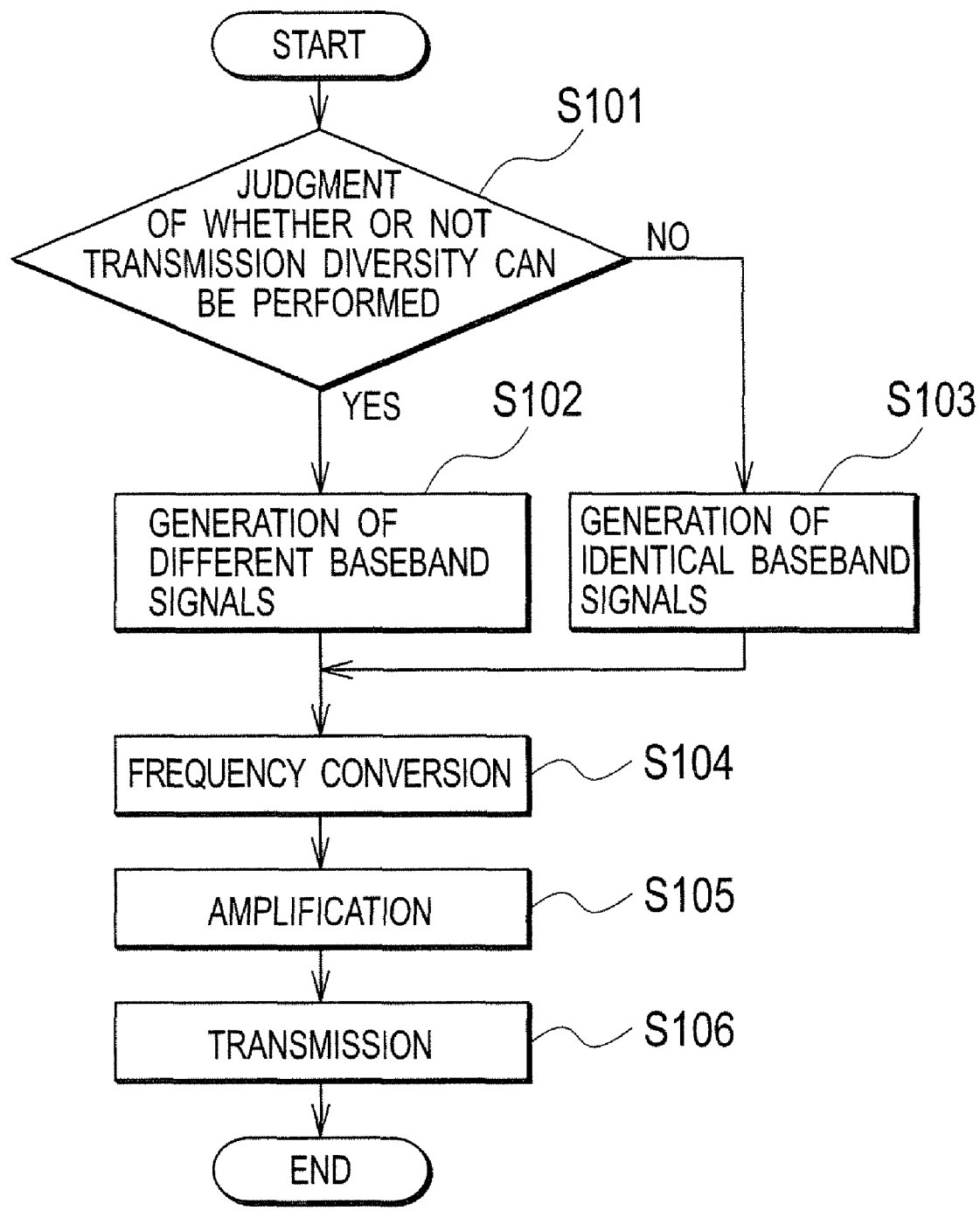
FIG. 9 is a flowchart showing procedures of a radio communication method according to the embodiment of the present invention.

Next, a radio communication method using the base station 10 will be described using FIG. 9. First, the base station 10 judges whether or not it is appropriate to transmit the RF signals while applying the transmission diversity using the plurality of antennas 16a and 16b (S101). In the case where the application of the transmission diversity is determined, the base station 10 generates the baseband signals having mutually different phases and amplitude as the baseband signals constituting the bases of the RF signals to be transmitted from the plurality of antennas 16a and 16b when applying the close loop transmission diversity scheme (S102).

On the other hand, in the case of determining the non-application of the transmission diversity in Step (S101), the base station 10 generates the baseband signals having the same symbol pattern and the same amplitude as the baseband signals constituting the bases of the radio frequency signals to be transmitted from the plurality of antennas 16a and 16b (S103).

Subsequent to Steps (S102) and (S103), the base station 10 subjects the baseband signals to the frequency conversion and forms the RF signals (S104). The base station 10 amplifies the RF signals (S105). The base station 10 transmits the amplified RF signals from the plurality of antennas 16a and 16b (S106).

With the base station 10 and the radio communication method described above, it is possible to judge whether or not it is appropriate to transmit the RF signals by applying the transmission diversity in order to obtain the high reception quality. When the base station 10 judges that it is more appropriate to transmit the RF signals by applying the transmission diversity, the base station 10 can transmit the RF signals by applying the transmission diversity using the plurality of amplifiers 15a and 15b as well as the antennas 16a and 16b. Consequently, the base station 10 can achieve improvement in the reception quality of the mobile station 20, an increase in the channel capacity, an increase in the user throughput, and the like by applying the transmission diversity.

On the other hand, in the case of determining the non-application of the transmission diversity, the base station 10 is able to generate the baseband signals having the same symbol pattern and the same amplitude, to amplify the signals with the plurality of amplifiers 15a and 15b and to transmit the signals from the plurality of antennas 16a and 16b. In this way, the base station 10 can achieve the transmission which is virtually similar to the case where a base station not applying the transmission diversity performs the transmission at the transmission power for transmitting the RF signals from a single antenna.

As a result, the base station 10 that can apply the transmission diversity is able to switch between the application and the non-application of the transmission diversity in order to obtain the high reception quality and to maintain the virtually covetable radio area without reduction even in the case of not applying the transmission diversity.

In other words, even though the base station 10 is configured to be capable of applying the transmission diversity scheme, the base station 10 is still able to create a radio environment similar to the case of the transmission from a single antenna without the application of the transmission diversity by transmitting the RF signals having the same symbol pattern and the same amplitude. Moreover, the base station 10 can make full use of the amount of the transmission power for both of the amplifiers 15a and 15b connected to the antennas 16a and 16b respectively. Hence, the radio area will not be reduced. The mobile station 20 can perform the reception while regarding the base station 10 as the base station configured to perform the transmission from a single antennal without applying the transmission diversity.

In general, it is difficult to evaluate whether or not it is appropriate to apply the transmission diversity accurately unless the base station 10 is located beforehand. Furthermore, the ambient environment may change after locating the base station 10. For this reason, there is a risk of locating the base station that is designed to be capable of applying the transmission diversity in the environment where the application of the transmission diversity would deteriorate the reception quality. On the other hand, even in the case of a base station having a large proportion of transmitting a channel having a large gain by applying the transmission diversity and thereby achieving the gain by applying the transmission diversity in the beginning of locating the station, there may be a case where the application of the transmission diversity incurs reduction in the radio capacity or deterioration in transmission efficiency due to a channel (such as the HS-DSCH) which is added afterward. Even in such a case, the mobile station 10 is able to obtain the high reception quality and to maintain the virtually coverable radio area without reduction.

Moreover, when the base station 10 determines not to perform the transmission applying the transmission diversity, the base station 10 can generate the baseband signals having mutually different phases for the antennas 16a and 16b. In this way, the base station is able to prevent interference attributable to the transmission of the RF signals obtained by the frequency conversion of the baseband signals having the same symbol pattern and the same amplitude and to further enhance the reception quality. In short, the base station 10 can prevent radio wave interference patterns generated as a consequence of simultaneously transmitting the RF signals having the same symbol pattern and the same amplitude by rotating the phase of the baseband signal for the antenna 16b, from the baseband signal for the antenna 16a, at the angular velocity calculated with the frequency.

In addition, it is possible to change the reception power of the signals to be received by the mobile station 20 by providing the phase difference between the RF signals for the antennas 16a and 16b. In short, it is possible to increase a change in the reception power of the mobile station 20 located within the scopes of the antennas 16a and 16b. In this way, the base station 10 can induce the user diversity effect on the control channel used for the adaptive modulation coding or the high-speed scheduling as represented by the high speed-downlink shared channel (HS-DSCH), for example. Eventually, it is possible to increase the transmission efficiency of the base station 10.

For example, in FIG. 8, the phase 2a of the reception signal, which is the signal from the antenna 16a received by the mobile station 20, depends on the position of the mobile station 20 in terms of the scopes. In the meantime, the phase 2b of the reception signal from the antenna 16b received by the mobile station 20 is rotated at the angular velocity obtained by the certain frequency f. For this reason, the reception signal at the phase 3 which is obtained by the signal combining can increase the signal power thereof. In short, the mobile station 20 can increase the reception power by the effect of the combining that strengthens the reception power of the reception signals.

Figure 1:
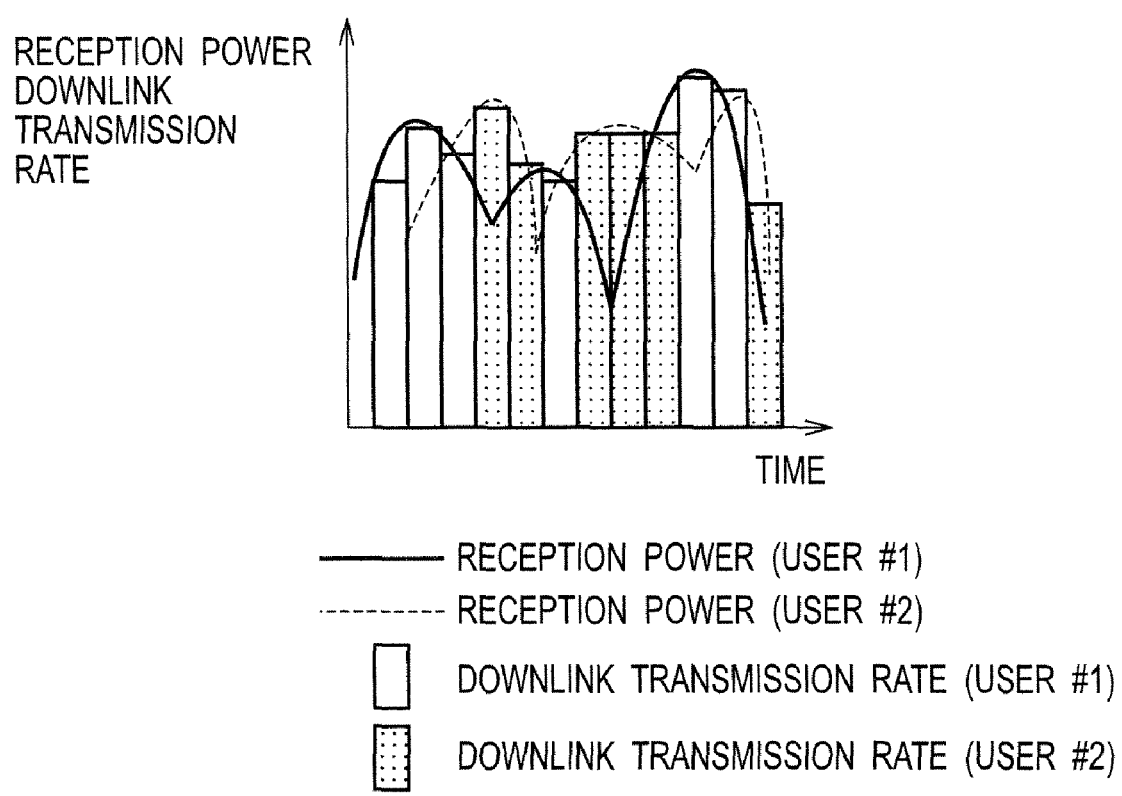
FIG. 1 is a view showing a user diversity effect in a case where a base station not applying a transmission diversity transmits signals by use of a single antenna.
Figure 2:
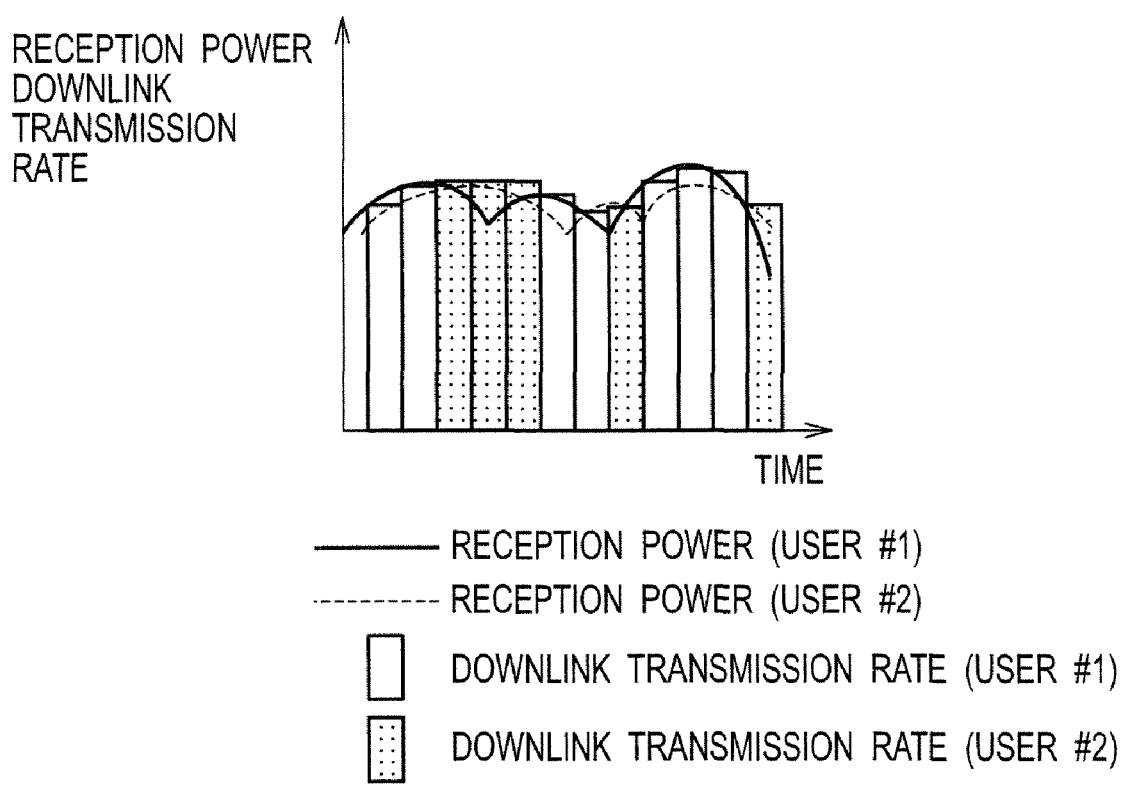
FIG. 2 is a view showing a user diversity effect in the case of using an open loop transmission diversity.

Meanwhile, when the phase of the reception signal of the signal from the antenna 16b is rotated approximately 180 degrees from the phase 2b illustrated in FIG. 8, for example, the reception signal of the signal from the antenna 16a and the reception signal of the signal from the antenna 16b cancel each other and the reception power is drastically reduced. In this way, it is possible to change the reception power by changing the phases. As a result, it is possible to offer the user diversity effect as shown in FIG. 1 with the base station 10 designed as to be capable of applying the transmission diversity by allocating the shared channel to a user having the high reception power.

MODIFIED EXAMPLE

The present invention is not limited only the above-described embodiment, and various modifications are possible. For example, although the above-described baseband signal processor unit 12 applies the closed loop transmission diversity scheme, it is also possible to apply the open loop transmission diversity scheme. The open loop transmission diversity scheme may be the STTD (Space Time block coding based Transmit antenna Diversity), for example. The STTD is configured to operate the symbol pattern of a particular antenna and to perform the maximum rate combining of the RF signals from the plurality of antennas at the mobile station 20.

Figure 10:
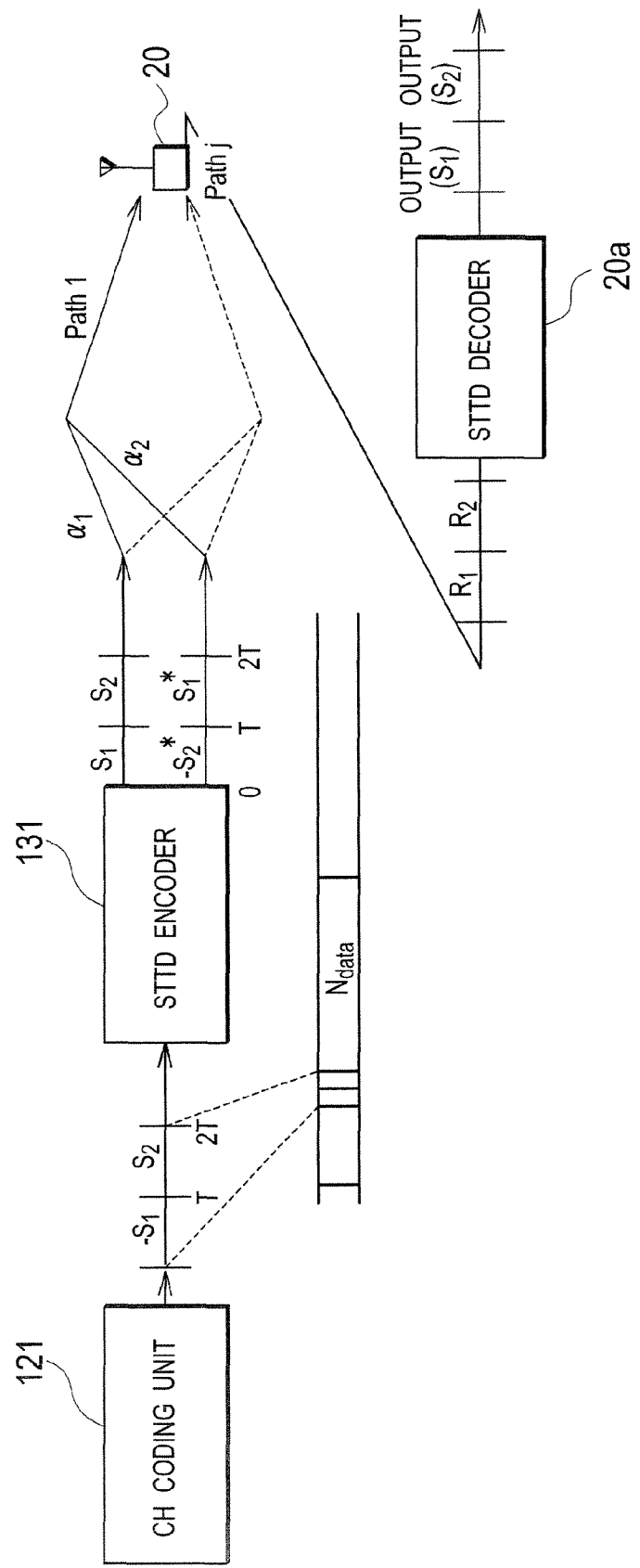
FIG. 10 is a view for explaining the STTD according to a modified example of the present invention.

When applying the STTD, the base station 10 includes an STTD encoder 131 shown in FIG. 10 within the layer-1 processor unit 12b shown in FIG. 5. Moreover, the judgment result made by the judging unit 123 shown in FIG. 5 is inputted to the CH coding unit 121. Furthermore, it is possible to provide adders 126e and 126f shown in FIG. 6 instead of the addition processor unit 126 shown in FIG. 5.

When the judging unit 123 determines the application of the transmission diversity, the CH coding unit 121 inputs the complex signal to the STTD encoder 131. The STTD encoder 131 acquires the complex signal from the CH coding unit 131, which includes a symbol pattern "$S_1, S_2$" in which symbols $S_1$ and $S_2$ are arranged in this order according to times 0, T, and 2T. The STTD encoder 131 use the acquired symbol pattern "$S_1, S_2$" for the baseband signal for the antenna 16a.

First, the STTD encoder 131 inverts the acquired symbol pattern in terms of time while defining two symbols of Si and $S_2$ as a pair to arrange the symbols in the order of $S_2$ and $S_1$. Moreover, the STTD encoder 131 inverts the polarity of the odd-numbered symbol $S_1$ as a conjugate complex. The STTD encoder 131 uses the symbol pattern "$-S_2^*, S_1^*$" thus obtained for the baseband signal for the antenna 16b.

The STTD encoder 131 inputs the complex signals respectively containing the symbol patterns of the baseband signals for the antennas 16a and 16b to the CH spreading processor unit 125. The CH spreading processor unit 125 executes the spreading process on both of the complex signals for the antennas 16a and 16b and inputs the complex signals respectively to the adders 126e and 126f shown in FIG. 6, which are provided instead of the addition processor unit 126 shown in FIG. 5.

The adders 126e and 126f add the CPICH signal and the SSCH signal to the complex signal containing the symbol pattern of the baseband signal for the antenna 16a and to the complex signal containing the symbol pattern of the baseband signal for the antenna 16b, respectively. In this way, the adders 126e and 126f input two types of the added signals for the antennas 16a and 16b to the SC spreading processor unit 127. Thereafter, the process, similar to the case in which the layer-1 processor unit 12b shown in FIG. 5 determines the application of the transmission diversity, is executed. As described above, in the case of applying the STTD, the baseband signal processor 12 generates the baseband signals having mutually different symbol patterns for the antennas 16a and 16b.

On the other hand, when the judging unit 123 determines the non-application of the transmission diversity, the CH coding unit 121 inputs the complex signals to the CH spreading processor unit 125 without inputting the signals to the STTD encoder 131. The CH spreading processor unit 125 executes the spreading process similar to the case of the closed loop transmission diversity scheme and inputs the complex signal only to the adder 126e.

The adder 126e adds the acquired complex signal, the CPICH signal and the SSCH signal together and inputs one type of the added signal to the SC spreading processor unit 127. Thereafter, the process, similar to the case in which the layer-1 processor unit 12b shown in FIG. 5 determines the non-application of the transmission diversity, is executed. Note that, as similar to the closed loop transmission diversity scheme, the processes (such as an error correction encoding or interleaving) other than the above-mentioned points are executed as in the case of not applying the STTD. As described above, when the STTD is not applied, the baseband signal processor unit 12 generates the baseband signals, which have the same symbol pattern and the same amplitude, for the antennas 16a and 16b.

When applying the open loop transmission diversity scheme, the mobile station 20 obtains reception signals $R_1$ and $R_2$ as shown in the following Formulae (2). Effects of noises and interference are ignored herein. Moreover, $\alpha_1$ and $\alpha_2$ respectively denotes fading vectors in propagation paths from the antenna 16a and the antenna 16b to the mobile station 20.

$$R_1 = \alpha_1 S_1 - \alpha_2 S_2^*$$

$$R_2 = \alpha_1 S_2 + \alpha_2 S_1^* \qquad \text{Formulae (2)}$$

The mobile station 20 executes the signal combining by use of an STTD decoder 20a shown in FIG. 10. Specifically, the STTD decoder 20a performs the maximum rate combining of the fading vectors $\alpha_1$ and $\alpha_2$ for each of the symbols S1 and S2 in accordance with Formulae (3) shown below, thereby obtaining an output (S1) and an output (S2). In this way, the base station 10 can achieve improvement in the reception quality, an increase in the radio capacity, and an increase in the transmission efficiency.

$$\text{Output } (S_1) = \alpha_1 * R_1 + \alpha_2 R_2 * = (|\alpha_1|^2 + |\alpha_2|^2) S_1$$

$$\text{Output } (S_2) = \alpha_1 * R_1 - \alpha_1 R_1 * = (|\alpha_1|^2 + |\alpha_2|^2) S_2 \quad \text{Formulae (3)}$$

Moreover, in addition to the base station 10 and the transmission diversity in compliance with the 3GPP definitions (such as 3GPP, TS25.211, TS25.212, TS25.213 or TS25.214), the present invention is applicable to any types of base stations configured to execute the transmission diversity by using a plurality of antennas.

In addition, the base station 10 may curtail the phase rotating means such as the frequency determiner unit 124 or the multiplier 129 show in FIG. 5. Meanwhile, the base station 10 may set the phase difference between the baseband signals for the antenna 16*a* and the antenna 16*b* by means other than the frequency determiner unit 124 and the multiplier 129. Moreover, although the baseband signal processor unit 12 includes the judging unit 123 in the base station 10, the judging unit 123 may be provided separately from the baseband signal processor unit 12.

Figure 11:
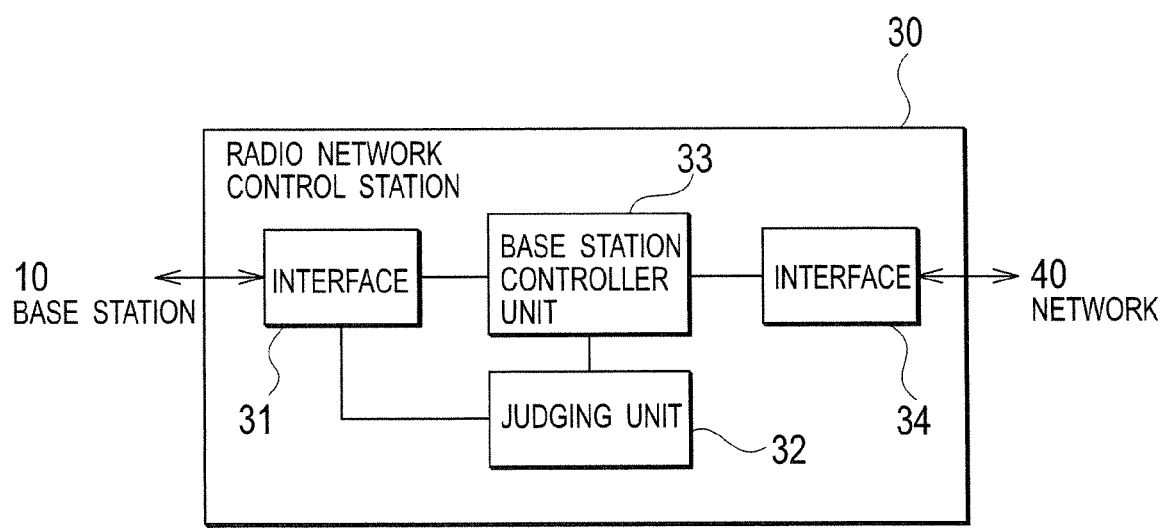
FIG. 11 is a block diagram showing a configuration of a radio network control station according to the modified example of the present invention.

Furthermore, the base station 10 may switch between the application and the non-application of the transmission diversity in accordance with control by the radio network control station 30. In this case, as shown in FIG. 11, the radio network control station 30 includes an interface 31 with the base station 10, an interface 34 with a network 40, a judging unit 32, and a base station controller unit 33.

Similarly to the judging unit 123 shown in FIG. 5, the judging unit 32 judges whether or not it is appropriate to transmit the RF signals by applying the transmission diversity using the plurality of antennas 16*a* and 16*b*. The judging unit 32 acquires a condition of a propagation path in the radio area covered by the base station 10, the types of channels transmitted by the base station 10, and the like from the base station 10 through the interface 31, for example. The judging unit 32 inputs the judgment result to the base station controller unit 33.

When the judging unit 32 determines the non-application of the transmission diversity, the base station controller unit 33 instructs the base station 10 to generate the baseband signals having the same symbol pattern and the same amplitude as the baseband signals constituting the bases of the RF signals to be transmitted from the plurality of antennas 16*a* and 16*b*. The base station controller unit 33 acquires the judgment result from the judging unit 32. The base station controller unit 33 is able to instruct the base station 10 by generating control data containing the instruction based on the acquired judgment result and transmitting the data to the base station 10 through the interface 31. In the case of determining the application of the transmission diversity, the base station controller unit 33 may transmit the control data for instructing the base station 10 to apply the transmission diversity or withhold the transmission of the control data.

In this case, the judging unit 123 of the base station 10 can determine the application or the non-application of the transmission diversity according to the control data from the radio network control station 30. Meanwhile, when the radio network control station 30 determines the application of the transmission diversity, the judging unit 123 can determine the application or the non-application according to whether the control data instructing non-application of the transmission diversity are received in the case where the control data are not transmitted. In addition, the base station controller unit 33 also transmits the control data concerning the call control and the like to the base station 10 through the interface 31.

Further, when judging unit 32 determines the non-application of the transmission diversity, the base station controller unit 33 may instructs the base station 10 to generate the baseband signals having mutually different phases for the antennas 16*a* and 16*b*. In this case, the base station controller unit 33 is able to determine the frequency to be used for setting the phase difference between the baseband signals for the plurality of antennas 16*a* and 16*b* in a similar manner to the frequency determiner unit 124 shown in FIG. 5, and to instruct the base station 10 accordingly. The base station controller unit 33 acquires information necessary for determining the frequency, such as the types of the channels of the complex signals contained in the baseband signals, from the base station 10 through the interface 31.

Meanwhile, the base station controller unit 33 may set the shared channel threshold and the dedicated channel threshold used for allowing the base station 10 to determine the frequency and inform the thresholds to the base station 10. The base station controller unit 33 can instruct the base station 10 by generating the control data containing the instruction and the set thresholds and transmitting the data to the base station 10 through the interface 31.

With the above-described radio network control station 30, it is possible to judge whether or not it is appropriate to transmit the RF signals by applying the transmission diversity in order to obtain the high reception quality. Moreover, the radio network control station 30 can instruct the base station 10 to generate the baseband signals having the same symbol pattern and the same amplitude in the case of determining the non-application of the transmission diversity. For this reason, when it is not appropriate to apply the transmission diversity, the base station 10 is able to generate the baseband signals having the same symbol pattern and the same amplitude in accordance with the instruction by the radio network control station 30, to amplify the signals by use of the plurality of amplifiers 15*a* and 15*b* and to transmit the signals from the plurality of antennas 16*a* and 16*b*. For this reason, with the radio network control station 30, it is possible to allow the base station 10, that can apply the transmission diversity, to switch between the application and the non-application of the transmission diversity in order to obtain the high reception quality and thereby to maintain the virtually coverable radio area without reduction even in the case of not applying the transmission diversity.

INDUSTRIAL APPLICABILITY

As described above, according to the present invention, it is possible to enhance the reception quality of a mobile station without causing a base station that can apply the transmission diversity to reduce a virtually covetable radio area.

The invention claimed is:

1. A base station comprising:
a plurality of amplifiers configured to amplify radio frequency signals;
a plurality of antennas configured to transmit the radio frequency signals amplified by the plurality of amplifiers;
a judging unit configured to judge whether or not to transmit the radio frequency signals by applying a transmission diversity for adjusting phases based on a feed back signal from a facing mobile station using the plurality of antennas; and
a baseband signal processor unit configured to generate baseband signals having an identical symbol pattern, an identical amplitude, and mutually different phases for the respective antennas, as baseband signals that are bases of the radio frequency signals to be transmitted from the plurality of antennas, when the judging unit determines not to apply the transmission diversity.

2. The base station according to claim 1, wherein
the baseband signal processor unit is configured to determine a frequency used for setting a phase difference between the baseband signals for the plurality of antennas, according to types of channels of complex signals contained in the baseband signals.

3. The base station according to claim 2, wherein
the baseband signal processor unit is configured to determine a low frequency as the frequency when a proportion of a complex signal on a shared channel is equal to or above a shared channel threshold, and to determine a high frequency as the frequency when a proportion of a complex signal on a dedicated channel is equal to or above a dedicated channel threshold.

4. The base station according to claim 1, wherein
the baseband signals having mutually different phases for the respective antennas are generated by rotation of phases of the baseband signals by use of a decided frequency.

5. The base station according to claim 1, wherein
the baseband signals having mutually different phases for the respective antennas are generated by changing a phase difference between the plurality of antennas by use of a predetermined frequency.

6. A radio network control station comprising:
a judging unit configured to judge whether or not a base station transmits radio frequency signals by applying a transmission diversity for adjusting phases based on a feed back signal from a facing mobile station using a plurality of antennas; and
a base station controller unit configured to instruct the base station to generate baseband signals having an identical symbol pattern, an identical amplitude, and mutually different phases for the respective antennas, as baseband signals that are bases of the radio frequency signals to be transmitted from the plurality of antennas, when the judging unit determines not to apply the transmission diversity.

7. A radio communication method comprising:
judging whether or not to transmit radio frequency signals by applying a transmission diversity for adjusting phases based on a feed back signal from a facing mobile station using a plurality of antennas;
generating baseband signals having an identical symbol pattern, an identical amplitude, and mutually different phases for the respective antennas, as baseband signals that are bases of the radio frequency signals to be transmitted from the plurality of antennas, when it is determined not to apply the transmission diversity;
amplifying the radio frequency signals obtained by subjecting the baseband signals to frequency conversion; and
transmitting, at the plurality of antennas, the amplified radio frequency signals.

8. A base station comprising:
a plurality of amplifiers configured to amplify radio frequency signals;
a plurality of antennas configured to transmit the radio frequency signals amplified by the plurality of amplifiers;
a baseband signal processor unit configured to generate baseband signals having an identical symbol pattern, an identical amplitude, and mutually different phases for the respective antennas, as baseband signals that are bases of the radio frequency signals to be transmitted from the plurality of antennas.

9. The base station according to claim 8, wherein
the baseband signals having mutually different phases for the respective antennas are generated by rotation of phases of the baseband signals by use of decided frequency for the respective antennas.

10. The base station according to claim 8, wherein
the baseband signals having mutually different phases for the respective antennas are generated by changing a phase difference between the plurality of antennas by use of a predetermined frequency.

11. A radio communication method comprising:
generating baseband signals having an identical symbol pattern, an identical amplitude, and mutually different phases for respective antennas, as baseband signals that are bases of radio frequency signals to be transmitted from a plurality of antennas;
amplifying the radio frequency signals obtained by subjecting the baseband signals to frequency conversion; and
transmitting, at the plurality of antennas, the amplified radio frequency signals.

* * * * *